United States Patent [19]

Narad

[11] Patent Number: 4,819,896
[45] Date of Patent: Apr. 11, 1989

[54] HAND-OPERATED AIRCRAFT CONTROL SYSTEM

[76] Inventor: James L. Narad, 274 Zandecki Rd., Chehalis, Wash. 98532

[21] Appl. No.: 823,612

[22] Filed: Jan. 29, 1986

[51] Int. Cl.$^4$ ............................................. B64C 13/04
[52] U.S. Cl. .................................... 244/234; 244/232; 244/220; 74/481; 74/523; 74/502.2
[58] Field of Search ............... 244/220, 221, 226, 232, 244/233, 234, 237, 17.19, 17.21, 235; 74/501 R, 504, 506, 511 R, 543, 544, 551.8, 551.9, 481, 501 A, 482, 523

[56] References Cited

U.S. PATENT DOCUMENTS

| | | | |
|---|---|---|---|
| 1,798,724 | 3/1931 | Chalmers | 244/234 |
| 1,855,988 | 4/1932 | Ranasey | 244/237 |
| 2,445,940 | 7/1948 | Copeland | 244/237 |
| 2,588,020 | 3/1952 | Libby | 244/237 |
| 2,659,554 | 11/1953 | Murphy | 244/234 |
| 2,683,381 | 7/1954 | Cadwell | 74/481 |
| 2,684,216 | 7/1954 | Oates et al. | 244/226 |
| 2,761,635 | 9/1956 | Hiller, Jr. et al. | 244/233 |
| 2,787,746 | 4/1957 | Redmond | 244/234 |
| 3,350,956 | 11/1967 | Monge | 244/234 |
| 4,037,850 | 7/1977 | Haberlin | 74/543 |
| 4,062,508 | 12/1977 | Stephens et al. | 244/234 |
| 4,130,259 | 12/1978 | Carlson et al. | 244/234 |
| 4,134,560 | 1/1979 | Masserschmidt | 244/234 |
| 4,461,189 | 7/1984 | Rottenkolber et al. | 74/506 |

FOREIGN PATENT DOCUMENTS

722390  5/1942  Fed. Rep. of Germany ...... 244/237

Primary Examiner—Galen Barefoot
Assistant Examiner—Rodney Corl
Attorney, Agent, or Firm—Klarquist, Sparkman, Campbell, Leigh & Whinston

[57] ABSTRACT

A hand-operated control system for aircraft comprises a push-pull cable operatively connected between a hand-operated actuator and an orientation means that controls the orientation of the aircraft during flight. The actuator is mounted on an existing hand-operated control in the cockpit of the aircraft with sufficient slack in the cable to permit independent operation of the control cable and existing control. The control system provides a redundant control system for pedal-operated controls, thereby allowing wounded pilots, paraplegics, and others to control pedal functions by hand manipulation of an actuator on an already existing hand-operated control.

18 Claims, 5 Drawing Sheets

HAND-OPERATED AIRCRAFT CONTROL SYSTEM

BACKGROUND OF THE INVENTION

1. Field of the Invention

This invention concerns a hand-operated control system for orienting aircraft. More particularly, it concerns a hand-operated yaw control system for controlling the tail rotor of a helicopter.

2. General Discussion of the Background

A helicopter is supported in hovering flight by rotation of a main rotor blade assembly comprised of two, three or four individual rotor blades. The altitude of the helicopter can be varied by changing the angle of attack of each of the individual blades, an increase in the angle of attack generating more lift while a decrease in the angle of attack generates less lift. Translational movement parallel to the ground is achieved by tilting the entire rotor blade assembly so that the tip plane path of the assembly tilts in the desired direction of horizontal movement.

In addition to the main rotor blade assembly, most helicopters are equipped with a tail rotor having an axis of rotation perpendicular to the rotational axis of the main rotor blade assembly. The purpose of the tail rotor assembly is to counteract the torque induced in the body of the helicopter by rotation of the main rotor assembly. The amount of antitorque force exerted by the tail rotor assembly is controlled by changing the angle of attack of the individual blades which comprise it.

In many conventional helicopters, the angle of attack of each of the main rotor assembly blades is controlled by a collective pitch lever or stick located by the left side of the pilot's seat. This lever is moved up and down by the pilot's left hand, and through a series of mechanical linkages changes the pitch angle of the main rotor blades. As the collective pitch lever is raised, there is a simultaneous and equal increase in the pitch angle of each of the main rotor blades; as the lever is lowered, there is a simultaneous and equal decrease in the pitch angle. The amount of movement of the lever determines the amount of pitch blade change, thereby determining the degree of upward or downward change in altitude.

A cyclic control stick is generally located in front of the pilot's seat so that it is positioned between the legs of the pilot. The purpose of the cyclic control is to tilt the tip-path plane in the direction of desired horizontal movement. The blades of the main rotor assembly are attached to a rotor disc which tilts in the direction that pressure is applied to the cyclic control stick. If the cyclic stick is moved forward, the rotor disc tilts forward; if the cyclic is moved aft, the rotor disc tilts aft, and so on.

The thrust produced by the tail rotor assembly is governed by the position of antitorque pedals located in front of and below the pilot's seat. The pedals are linked to a pitch change mechanism in the tail rotor gear box to permit the pilot to increase or decrease the pitch of the individual tail rotor blades. The changing pitch of these blades exerts a varying force to counteract the torque exerted on the body of the helicopter by rotation of the main rotor assembly. An additional function of the tail rotor assembly is to control heading of the helicopter during hovering flight and hovering turns.

It is a demanding task to pilot a helicopter since the pilot must constantly be operating the variety of control sticks and pedals in the cockpit. A change in altitude, for example, requires an increase in engine RPM, thereby increasing the amount of torque imparted to the helicopter body and requiring application of force to the tail rotor control pedals to counteract the additional torque. Changes in air density at varying altitudes can also affect required rotor RPM, thereby requiring compensating movements of the collective control stick and rotor pedals. Because of the necessity for constant manipulation of the foot pedals in response to changing conditions, it is essential that a helicopter pilot have complete control over these pedal functions if disaster is to be avoided.

One of the hazards of piloting a helicopter, especially in battle conditions, is that the pilot can be wounded and lose control of leg functions. When such an incident occurs, the pilot loses a vital degree of control over the aircraft, and fatal crashes often ensue.

Since helicopters have controls that typically require manipulation with both arms and both legs, paraplegics have also been unable to fly them. Some attempts have been made to develop control systems that eliminate the need for pedal movement, yet none of them have had wide acceptance.

Conventional fixed wing aircraft also have pedals for controlling rudders involved in operation of the aircraft. Although the demands on the pilot are not as constant in a fixed wing aircraft as in a helicopter, there still exists a need for providing aircraft controls that can be operated by someone without the use of his legs or feet.

Although many efforts have been made to provide an aircraft or helicopter that eliminates the need for operation of foot pedals, a truly satisfactory solution has not been found. For example, U.S. Pat. Nos. 1,798,724, 3,350,956, and 4,134,560 all disclose mechanisms for eliminating foot pedal controls in an aircraft. All these mechanisms, however, require extensive modifications to the aircraft itself because the control sticks and pedals are eliminated and their functions incorporated into a single device. The solutions disclosed in these patents have never been widely accepted because of the expense of modifying the basic control systems of the aircraft. Furthermore, such integrated control systems are unsuitable for adapting an already existing helicopter or airplane for use by a paraplegic.

U.S. Pat. No. 4,062,508 concerns a helicopter rotor control mechanism for combining cyclic and collective rotor control functions in a single stick. It does not address the problem of providing tail rotor control without the use of foot pedals.

It is accordingly an object of this invention to eliminate the necessity for using foot pedals in controlling an airplane, helicopter, or other vehicles having a foot-actuated orientation control system.

Another object of the invention is to provide a hand-operated control system for orienting such craft which can be easily installed on existing aircraft without the necessity for extensive modification of the underlying control system.

It is still another object of the invention to provide a redundant, hand-operated control system which can function in tandem with or in place of existing foot pedal controls.

Yet another object is to provide a hand-operated control system that can be mounted on existing hand-operated control sticks without affecting the operation of the existing controls while allowing completely independent operation of the control system and existing hand-operated controls.

Finally, it is an object of this invention to provide such a system that can be economically and quickly installed.

SUMMARY OF THE INVENTION

In accordance with the foregoing objects, the present invention comprises a hand-operated push-pull control system for controlling an orientation means that affects orientation of the aircraft during flight. The control system comprises a push-pull control means operatively connected to the orientation means for controlling operation of the orientation means, and a hand-operated control actuating means in the cockpit operatively connected to the push-pull control means such that operation of the control actuating means operates the orientation means.

In the preferred embodiments, the hand-operated control actuating means is a rotatable handle grip member mounted on an existing control stick in the cockpit of the aircraft, and the push-pull control means is a push-pull cable secured at a first end to the rotatable member and connected at a second end to the orientation means.

In an especially preferred embodiment, the control system comprises a rotatable handle grip mounted on the cyclic control stick in the cockpit of a helicopter. The push-pull cable is mounted at its first end to the handle grip and at its second end to the pedal control rod which controls the angle of attack of the tail rotor blades. A first stationary mounting may be provided for the cable sheath adjacent the handgrip on the cyclic control stick for providing a fixed point against which the push-pull cable pulls. Similarly, a fixed mounting for the cable sheath may be provided on the frame of the helicopter adjacent the pedal control rod for more effective positive movement of the control rod as the push-pull cable is operated.

In yet other embodiments, the handgrip may comprise first and second rotatable members having axes of rotation perpendicular to one another. The first rotatable member is connected to the pedal control rod by means of a push-pull cable, while the second rotatable member is connected to a collective control rod through a push-pull cable for providing altitude control. Such a structure is an easily installed, redundant system that incorporates all of the helicopter orientation controls into a single control stick.

To provide additional leverage in operating the handle grip controls, a hand-wrist extension may be provided on the handle grip in hand-engaging relationship to the back of a hand which grips the handle grip. The extension spans substantially the distance from an operator's knuckles to his wrist, and requires less exertion of effort in rotating the hand control.

In yet other embodiments, the second end of the push-pull cable may be connected in actuating relationship to a fluid-actuated boost for moving the control rods. Such a boost is especially useful for those aircraft in which a push-pull cable alone would provide insufficient mechanical advantage to operate the control rods. Another advantage of the boost is that it can eliminate the need for exerting constant pressure on the controls to maintain them in a fixed position.

Other objects of the invention will be apparent from the drawings and following detailed description.

DETAILED DESCRIPTION OF PREFERRED EMBODIMENTS

Embodiment of FIGS. 1-7

Figure 13:
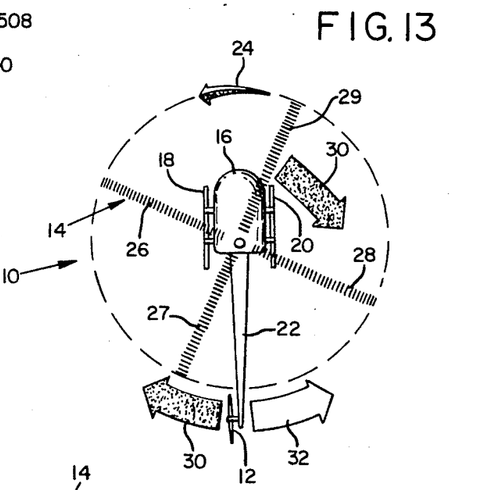
FIG. 13 is a schematic view of a conventional helicopter showing the main rotor assembly, tail rotor assembly, and the directions of rotor rotation and torque counteraction.

One embodiment of the present invention is a hand-operated yaw control system for a helicopter 10 (FIG. 13) having a tail rotor 12 for counteracting torque induced by rotation of a main rotor assembly 14. As is conventional in the art, main rotor assembly 14 is rotatably connected to control spindle 38 (FIG. 14) above the cockpit 16 of the helicopter, and has an axis of rotation substantially transverse to the axis of rotation of tail rotor 12. Helicopter 10 includes landing skids 18, 20, and tail section 22. Main rotor assembly 14 has individual rotor blades 26, 27, 28, 29, the direction of rotation of the blades being shown by arrow 24. The direction of torque induced by rotation of assembly 14 is shown by arrows 30, while the direction of tail rotor thrust to compensate for torque is shown by arrow 32.

Figure 14:
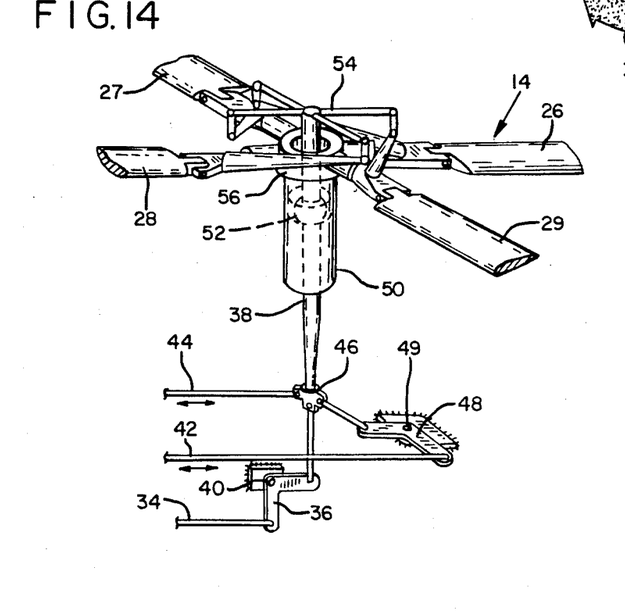
FIG. 14 is a schematic, fragmentary view of the main rotor assembly and structures controlled by the cyclic and collective sticks in the cockpit.

FIG. 14 shows a particular mechanism for changing the pitch of blades 26, 27, 28, 29 and the tilt of the tip path plane in response to movement of the cyclic and collective control sticks. These control mechanisms include a collective control rod 34 connected to crank 36 which in turn connects control rod 34 to control spindle 38. Crank 36 is pivotally mounted at pivot 40.

Lateral cyclic control rod 42 and longitudinal cyclic control 44 are connected to rotating ball joint 46 through crank 48 which is pivotally mounted to the helicopter body at 49. Control spindle 38 projects into hollow drive shaft 50 which contains spherical bearing 52.

Movement of collective control rod 34 is communicated through spider 54 to each of individual blades 26, 27, 28, 29 for collectively and simultaneously changing the angle of attack. Movements of cyclic control rods 42, 44 are similarly communicated to rotor plate 56 for changing the tip path plane of rotor assembly 14 to effect horizontal movement in the direction of tilt.

Figures 1, 2:
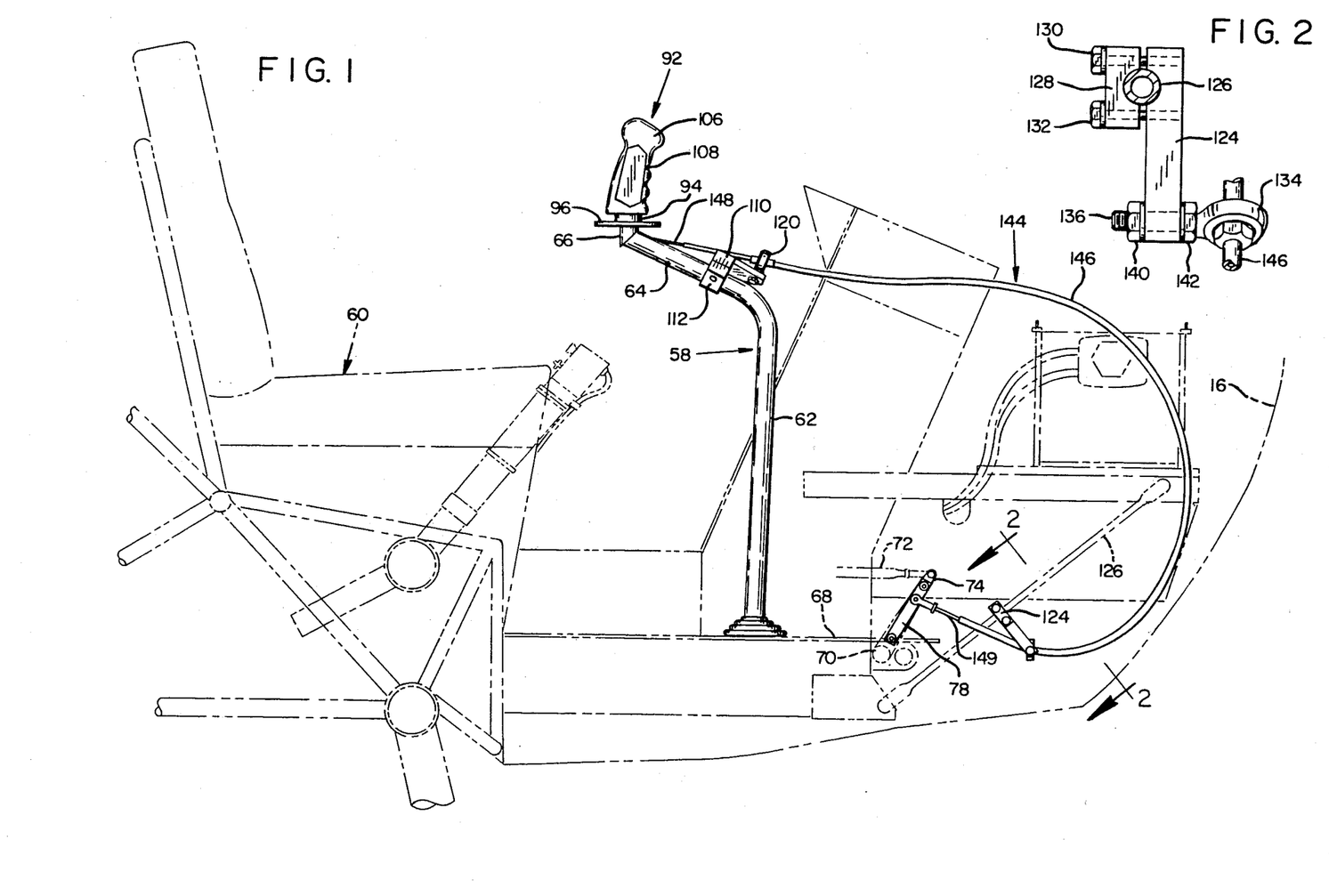
FIG. 1 is a side elevational view of the cockpit of a helicopter fitted with the hand-operated yaw control system of the present invention, only portions of the cockpit bubble being shown.
FIG. 2 is a fragmentary cross-sectional view of a mounting bracket portion of the control system taken along section lines 2—2 in FIG. 1, only portions of the push-pull control cable being shown.
Figures 3, 4, 6:
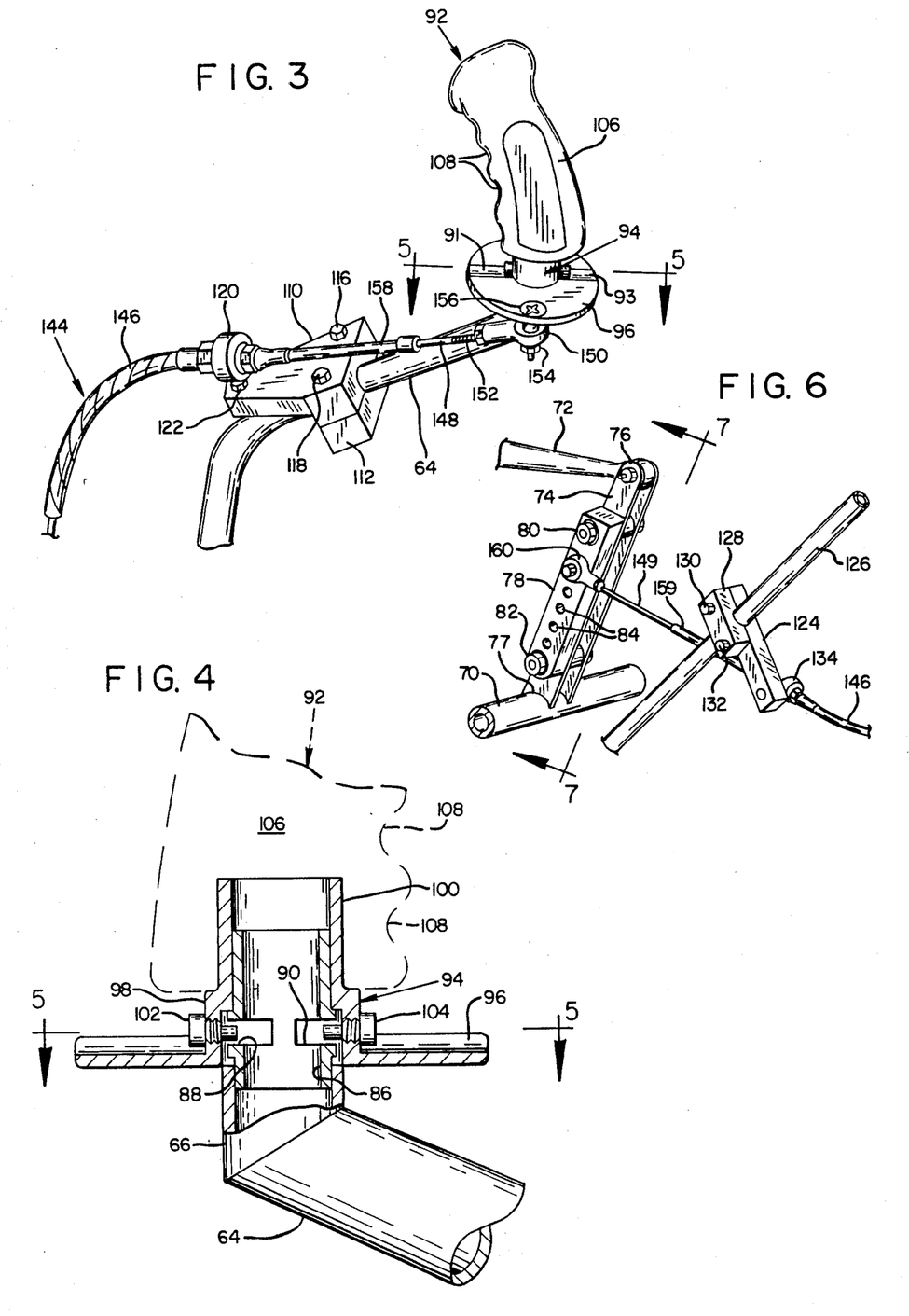
FIG. 3 is a fragmentary perspective view of the handle grip portion of the system of FIG. 1 mounted on a cyclic control stick, only the upper portion of the control stick being shown.
FIG. 4 is an enlarged, vertical sectional view of the rotatable mounting of the handle grip of FIG. 3, portions of the handle grip being shown in phantom.
FIG. 6 is a perspective view showing the details of mounting of the push-pull cable portion of the system of FIG. 1 to the conventional pedal control linkage for the tail rotor control.

Referring now to FIG. 1, the control system of the present invention includes a conventional hollow, cyclic control stick 58 mounted in front of pilot's seat 60 such that it will occupy a position between the legs of a person seated in seat 60. Cyclic stick 58 comprises a first upright portion 62, second angled portion 64, which is angled in the direction of seat 60, and second upright portion 66. First portion 62 passes through floor 68 of helicopter 10 and communicates with linkages 42, 44 (FIG. 14) for controlling the collective pitch of blades 26-29 through longitudinal and lateral movement of stick 58. As best seen in FIG. 4, upright portion 66 has a circular open top for insertion of a spindle to be described below.

A foot pedal (not shown) is mounted to a pedal shaft 70 for oscillating rotation of shaft 70 (FIGS. 6 and 7) about its longitudinal axis. A tail rotor control rod 72 is connected to pedal shaft 70 by a control link arm 74. Link arm 74 is pivotally attached to rod 72 at pivot connection 76, while link arm 74 is affixed to shaft 70 at 77.

Figure 7:
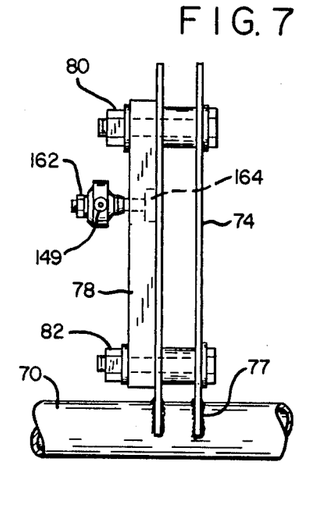
FIG. 7 is a view taken along lines 7—7 of FIG. 6.

A removable attachment block 78 is secured to link arm 74 by first and second nut and bolt assemblies 80, 82. Block 78 is a rectangular member having a plurality of anchor holes 84 therethrough which serve as alternative cable attachment sites. The series of holes 84 span substantially the length of block 78 between shaft 70 and rod 72 to provide adjustable cable attachment means. In especially preferred embodiments, only one attachment means is provided on block 78.

Returning now to FIG. 4, a cylindrical spindle 86 is carried within the open top end of upright portion 66 of cyclic stick 58. Spindle 86 has an outer diameter substantially equal to the inner diameter of portion 66 so that it can be firmly retained therewithin when inserted through the open top. The spindle is spot welded in place to prevent it from rotating. Spindle 86 also has a pair of opposing limit slots 88, 90 that extend substantially around the periphery of spindle 86 above the top of upright portion 66.

A handle grip 92 is rotatably mounted to spindle 86 by a rotatable, sleeve-like member 94 having an enlarged, disc base 96, intermediate diameter portion 98, and reduced diameter sleeve portion 100. A pair of opposing retention and limit screws 102, 104 extend through portion 98 and protrude, respectively, into limit slots 88, 90 of spindle 86. Diametrically opposed grooves 91, 93 in the top surface of disc base 96 (FIGS. 3 and 5) allow insertion of limit screws 102, 104. Handle grip 92 is molded to closely fit in secure, nonrotatable engagement about sleeve portion 100 of member 94, and further includes an upright butt 106 having a plurality of finger-receiving indentations 108 along its back side to provide a comfortable grip. The enlarged disc base 96 of handle grip 92 provides a resting surface for the hand of an operator.

A first stationary mount 110 (FIGS. 1 and 3) is secured to angle portion 64 of cyclic stick 58 by a bracket 112 and bolts 116, 118 extending through both mount 110 and bracket 112. Stationary mount 110 is positioned closely adjacent handle grip 92. A rotatable collar 120 is secured to mount 110 through a rotatable attachment 122 which permits collar 120 to rotate relative to mount 110 about an axis perpendicular to the top plane surface of the mount.

A second stationary mount 124 is secured to a stationary portion of helicopter 10 at a position adjacent control link arm 74. In the representative mode of helicopter illustrated in the drawings, battery strut 126 constitutes a suitable anchor site, and mount 124 is secured in place about strut 126 by a bracket 128 (FIGS. 2 and 6) having a pair of bores therethrough. A pair of internally threaded, complementary, aligned bores are provided through mount 124, and bolts 130, 132, are placed through the aligned bores to hold mount 124 in fixed engagement to strut 126. Mount 124 is also provided with a rotatable collar 134 which rotates about an axis defined by threaded extension 136 (FIG. 2) of the collar, the extension 136 being rotatably engaged by a pair of internally threaded nuts 140, 142.

A conventional push-pull cable assembly 144 shown in FIGS. 1 2 3 and 6 can be purchased from Cable Craft, Inc., of Tacoma, Washington, part No. 580-700-021-TT-3-58. Such an assembly is a flexible linkage means interconnecting rotatable grip control 92 and oscillatable link arm 74 for operating the control rod 72 of the orienting means. Cable assembly 144 includes a push-pull cable (not shown) reciprocable within an outer covering 146 and connected at its opposite ends to actuating rods 148, 149. Rod 148 is pivotally connected at its free end to disc 96 by a rod connector 150. Similarly, rod 149 is pivotally connected at its free end by a rod connector 160 to mounting block 78 of link arm 74. Rigid sheaths 158, 159 surround portions of rods 148, 149, respectively, to restrain such rods against bending. Each sheath 158, 159 is anchored to its respective collar 120, 134. Thus, collars 120 and 134 afford fixed push-pull anchor points against which covering 146 and sheaths 158 and 159 act and react when rod 148 and its connected cable are reciprocated within them.

Cable assembly 144 is long enough between its anchor collars 120, 134 that complete freedom of movement of control stick 58 is allowed without affecting operation of the control stick 58. Since only the covering of cable assembly 144 is anchored to mount 110, control stick 58 can similarly be moved without affecting the tail rotor control. Accordingly, cable assembly 144 can operate through rotation of grip 92 completely independently of the function controlled by stick 58.

Operation of Embodiment of FIGS. 1-7

Figure 5:
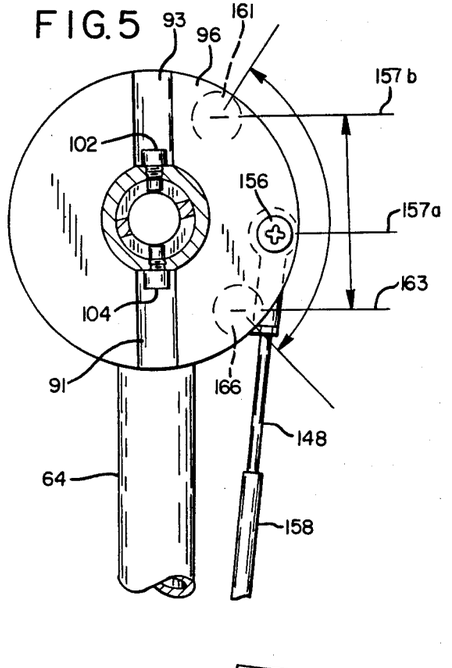
FIG. 5 is a view taken along line 5—5 of FIG. 4 and rotated 45 degrees.

In operation, the embodiment of FIGS. 1-7 is operated by a pilot who sits in seat 60 and grasps handle grip 92 with the palm of his hand against the side of handle grip 92 and his fingers curled in engagement around indentations 108. When the pilot desires to rotate the helicopter about its vertical axis in a direction to his left, handle 92 is rotated around its vertical axis in a counter-clockwise direction as viewed from above, thereby exerting a pull on rod 148. As best seen in FIG. 5, movement of screw 156 to position 161 extends rod 148 from position 157a to position 157b. This pulling force is transmitted through cable assembly 144 and rod 149 to link arm 74, which is in turn pulled toward the front of cockpit 16. As link arm 74 moves forward, tail rotor control rod 72 is translated in a forward direction with respect to the seated pilot, thereby changing the angle of attack of the tail rotor blades in a known fashion to exert a tail torque force which turns the helicopter to the left about its vertical axis.

When the pilot wants to decrease the leftward torque or exert a tail rotor torque in the opposite direction, handle grip 92 is grasped and rotated clockwise about its vertical axis until screw 156 reaches the position designated 166 in FIG. 5. As disc 96 rotates, rod 148 is pushed into sheath 158 from position 157 to position 163, and a push is communicated through cable assembly 144 and exerted against link arm 74 through rod 149. This pushing force is in turn communicated to rod 72 which, through a linkage (not shown), alters the angle of attack of the blades in the tail rotor in a manner known in the art. The tail rotor then exerts a tail torque which moves the helicopter toward the right as viewed by the pilot seated in seat 60.

Figure 8:
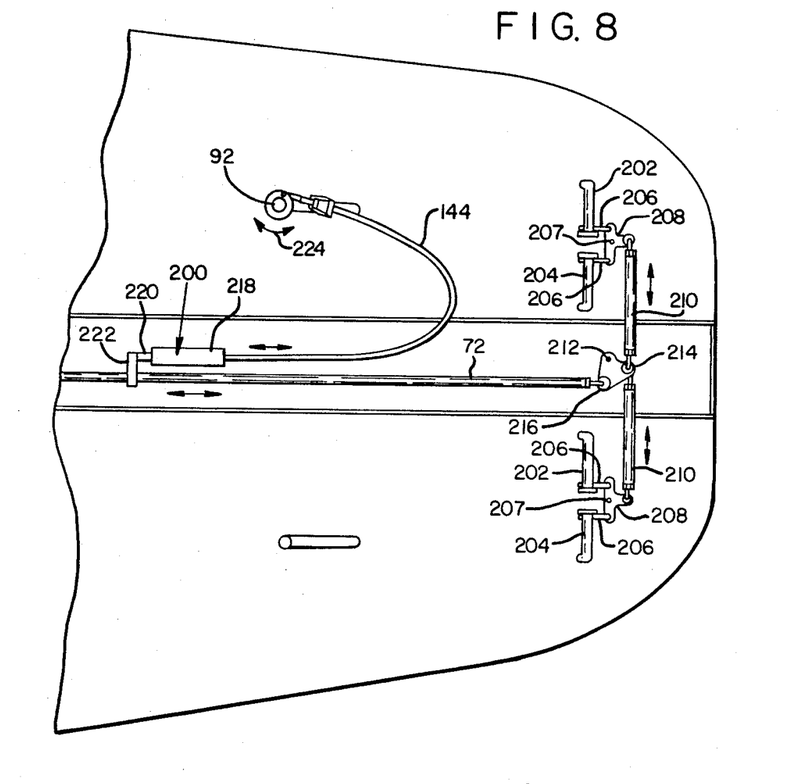
FIG. 8 is a fragmentary schematic view of a second embodiment of the invention in which the push-pull cable of the control system is connected in actuating relationship to a fluid-actuated boost that moves the tail rotor control rod, the pedals and pedal linkages to the tail rotor control rod also being different than in the embodiment of FIGS. 1-8.
Figures 9, 10, 11:
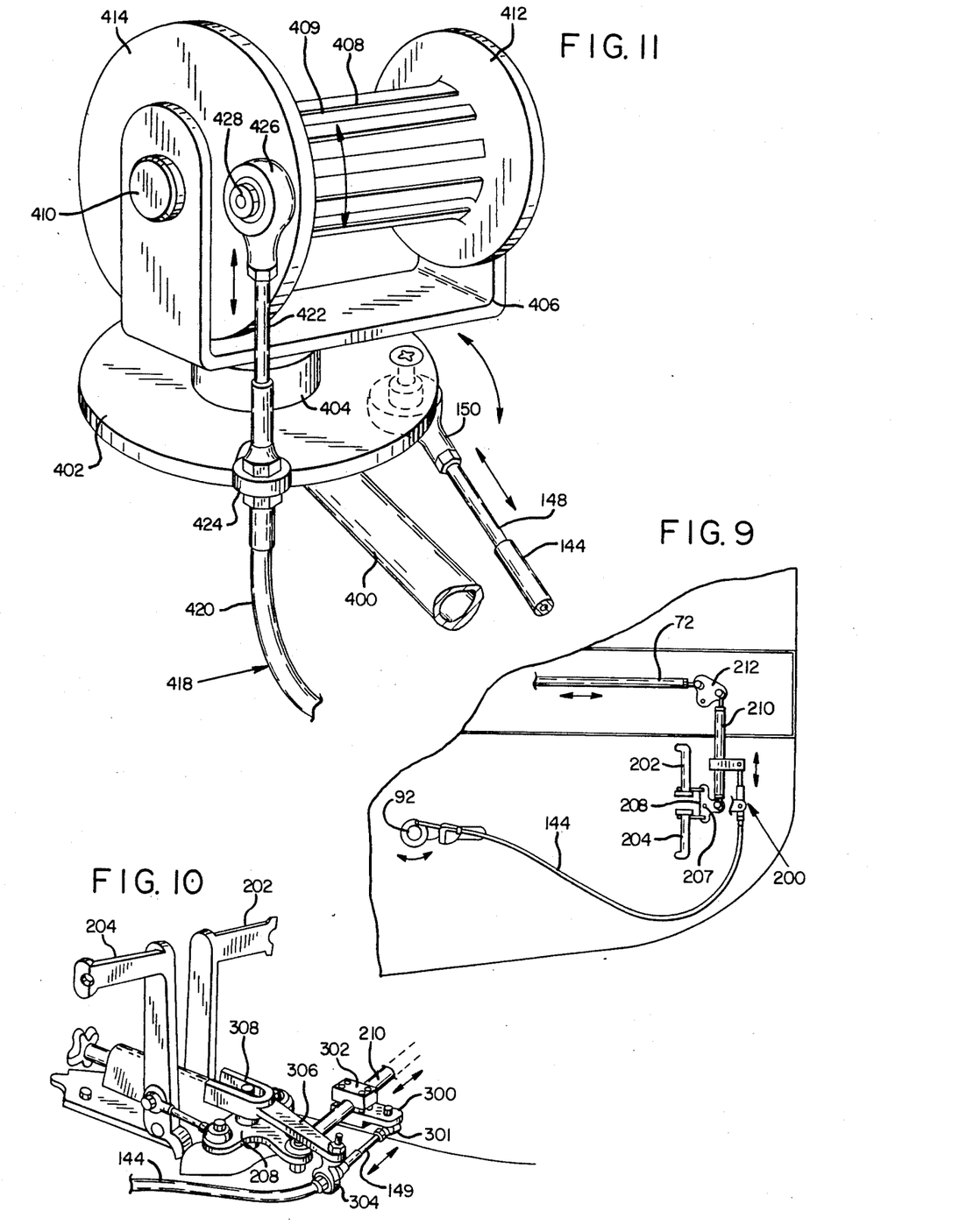
FIG. 9 is a fragmentary schematic view similar to that of FIG. 8 showing a third embodiment in which the boost is attached to a pedal rod, but with only one pair of pedals being connected to the control rod in this embodiment.
FIG. 10 is an enlarged, perspective view of another embodiment similar to FIG. 8 but without a boost.
FIG. 11 is a perspective view of the handle grip portion of another embodiment of the control system in which two separate control functions controlled by separate control cables can be controlled with a single handle grip control on a single control stick.

Embodiments of FIGS. 8-10

FIG. 8 is a view of an alternative embodiment of the invention wherein like parts are given like reference numerals to the numerals assigned in FIGS. 1-7. The pedals in this embodiment, however, are attached to a bell crank instead of a rotating shaft, and a fluid-actuated boost 200 moves control rod 72. Such an arrangement is conventional in some models of existing helicopters.

Each of pedals 202, 204 is attached through a linkage 206 to a pivotally mounted, T-shaped swivel crank 208. A first pedal 202 is mounted on a first arm of swivel crank 208 and second pedal 204 is mounted on the second arm of swivel crank 208. A pedal rod 210 interconnects each swivel crank 208 with a pivotal bell crank 212. The end of each pedal rod 210 is pivotally connected to bell crank 212 at 214, and rod 72 is in turn pivotally connected to crank 212 at connection 216.

Conventional fluid-actuated boost 200 includes a stationary cylinder 218 having a piston rod 220, secured to control pedal rod 72 through attachment block 222 for moving the control rod. As discussed above, rod 72 is part of an orientation control means that changes the angle of attack of tail rotor blades. Boost 200 is of a kind known in the art and sold, for example, by Teleflex, Inc., of North Wales, Pa. 19454 as a pneumatic boost cylinder, part Nos. 90000-1, 90000-2, 90000-3 or 90000-4. Teleflex, Inc. also sells a "Combination Cable" for use with its pneumatic boost cylinder that can be purchased as a single unit to serve as cable assembly 144 and boost 200 of the present invention. Boost 200 can also be hydraulically actuated.

The embodiment of FIG. 8 is operated by twisting handle grip 92 about its vertical axis in the directions suggested by travel arrow 224. Rotation of handle grip 92 reciprocates a cable within assembly 144 (in a manner similar to that described in connection with the embodiment of FIGS. 1-7) to actuate boost 200 and move rod 72. This system is designed such that rotation of handlegrip 92 toward the pilot's right will turn the helicopter toward the right, while rotation of the handle grip toward the left turns the helicopter toward the pilot's left.

The embodiment of FIG. 9 is similar to that shown in FIG. 8, and like parts have been given like reference numerals. The primary difference between this embodiment and that shown in FIG. 9 is that only one set of pedals 202, 204, are shown, and cable assembly 144 is attached to pedal rod 210 instead of tail rotor rod 72. Another difference is that boost 200 is secured to pedal rod 210 instead of rod 72. The function of this embodiment is analogous to that described in connection with FIG. 9.

FIG. 10 shows an embodiment identical to the embodiment of FIG. 9, except boost 200 has been eliminated and is replaced by the push-pull cable shown in FIG. 10. The end of rod 149 is attached to pedal rod 210 by means of block 300 and bracket 302. The block and bracket are secured to one another with nut and bolt assemblies, and rod 149 is attached to block 300 with anchor 301. Collar 304 holds the covering of cable assembly 144 fixed such that force exerted by movement of rod 149 will be directed in a single line of force against block 300 and rod 210. Collar 304 is held in place by an extension 306 having a U-shaped base 308 fixed to the stationary pivot 207 (FIG. 8) about which swivel crank 208 is rotated by actuation of pedals 202 and 204.

Embodiment of FIG. 11

FIG. 11 discloses yet another embodiment of the invention having a first rotatable member mounted on cyclic stick 400 in a manner similar to the attachment of handle grip 92 to cyclic stick 58 shown and described in connection with FIG. 4. The first rotatable member includes a disc 402 rotatably carried by a stationary spindle (such as spindle 86 shown in FIG. 4) mounted on cyclic stick 400. Disc 402 has a cylindrical upright projection 404 on which a U-shaped bracket 406 is fixed. The parallel arms of bracket 406 rotatably mount a cylindrical handle grip 408 which rotates about an axis transverse to the axis of rotation of disc 402. Handle grip 408 is rotatably mounted between the arms of bracket 406 with a pair of opposing pins 410 (only one of which is shown in FIG. 11). Handle grip 408 has a first enlarged diameter portion 412 which serves as a guide for handle grip 408 as it is rotated, and a second, even more greatly enlarged diameter portion 414 at the other end of handle grip 408. A series of longitudinal ribs 409 extend along handle grip 408 to provide a surface around which the fingers of a pilot may firmly be placed.

Rod 148 is attached to disc 402 in the same manner that rod 148 is attached to disc 96 in FIG. 3. This embodiment differs, however, in having a second cable assembly 418 to control pitch of the blades of the main rotor assembly 14. Cable assembly 418 is similar to assembly 144 and includes a cable covering 420 inside of which reciprocates a steel encased cable attached to rod 422. Covering 420 of assembly 418 is held stationary relative to the longitudinal axis of assembly 418 by rotatable collar 424. Assembly 418 is operated by rotation of handle grip 408 about its longitudinal axis, which is perpendicular to the rotational axis of projection 404. Collar 424 provides a fixed point for holding covering 420 relatively immobile as rod 422 and its attached cable reciprocate.

Reciprocating force is exerted against rod 422 by rotation of enlarged diameter portion 414, which effects arcuate movement of internally threaded rod anchor 426 fixed to portion 414 by a nut and bolt assembly 428. The opposite end of cable assembly 418 is connected to collective control rod 34 (FIG. 14) for changing the angle of attack of the individual blades 26-29 to change the altitude of the helicopter. Cable 418 can be connected to rod 34 by a structure such as block 300 shown in FIG. 10 or a boost arrangement as shown in FIG. 8 for tail rotor control rod 72.

In this manner, all of the helicopter controls (collective, cyclic and foot pedal rotor controls) can be operated from a single control stick, which in this instance is cyclic stick 400.

Figure 12:
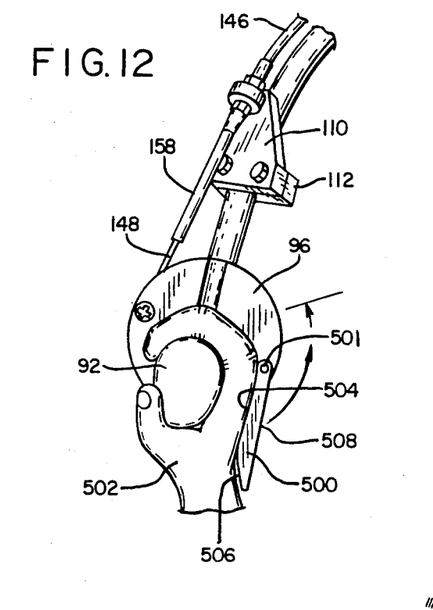
FIG. 12 is a top plan view of a modified handle grip control for the systems of FIGS. 1-11 incorporating a hand-wrist support for providing additional purchase in rotating the handle grip.

Embodiment of FIG. 12

In still another embodiment of the invention shown in FIG. 12, like parts have been given like reference numerals to those numerals assigned in FIGS. 1-7. This embodiment differs from that shown in the earlier figures only by the provision of a hand-wrist extension 500 mounted by pin 501 on disc 96 in radially spaced relationship to handle grip 92. Extension 500 extends in a plane roughly parallel to the back of a hand 502 placed around handle grip 92. Extension 500 extends substantially the distance from the knuckles of hand 502 at the periphery of disc 96 to the wrist of hand 502.

Extension 500 has a first flat hand-engaging surface 504 approximately parallel to the back of hand 502, a second flat surface 506 at an oblique angle to surface 504 for following the natural curve of the back of hand 502 adjacent the wrist, and a third flat surface 508 which connects surfaces 504, 506. Extension 500, by engaging the back of the hand, provides additional torque by transmitting the pressure exerted thereon by the back of the pilot's hand through pin 501 to assist rotation of disc 96, thereby reducing the amount of effort required to turn disc 96 and move the orientation rods.

It will be apparent that the present invention can be used with fixed wing aircraft having pedal controls. The present control system can also be used to merely incorporate the control systems of two hand-operated levers into a single lever without necessarily taking over the function of any pedal controls.

This control system can be used either in place of existing pedal controls, or as a redundant system which does not affect the operation of existing pedal controls. The presence of a redundant system offers a pilot versatility of control by allowing him to move back and forth between pedal and hand-operated controls for the tail rotor. Such versatility reduces pilot fatigue and is especially helpful in battle situations where a pilot's legs may be suddenly disabled.

It is a special advantage of the present invention that it can be quickly and economically installed on existing helicopters without modifying or affecting the underlying structure or function of their controls. This aspect of the control system makes it clearly superior to those systems in the prior art which called for wholesale modification or replacement of existing control systems.

Method of Conversion

A part of this invention is a method of converting a pedal-operated control system in an aircraft such as helicopter 10, to a hand-operated control system such as that shown in FIGS. 1-7 or the other embodiments. In connection with the embodiment of FIGS. 1-7, the method comprises the steps of removing, such as by sawing off, the closed top end portion 66 of cyclic stick 58 to expose a circular opening into which spindle 86 is inserted. Spindle 86 may be stabilized against rotation in the interior of portion 66 by spot welding. First rotating member 94 is then placed in rotating relationship around spindle 86, and limit screws 102, 104 are placed through portion 98 of member 94 and disposed within slots 88, 90, respectively.

Rod 148 at the first end of push-pull cable assembly 144 is then secured to first rotating member 94 with anchor 150. Rod 149 at the second end of assembly 144 is connected to control rod 72 by attachment of anchor 160 to one of anchor holes 84 with a bolt. The cable is long enough to have slack in it such that movement of the control stick does not affect function of the cyclic control stick 58.

The present method also includes securing a first stationary mount 110 to cyclic stick 62 adjacent disc 96 for maintaining the covering 146 of assembly 144 stationary as disc 96 moves to reciprocate the cable within covering 146. First stationary mount 110 is provided with rotatable collar 120 which rotates about one axis perpendicular to the top surface of mount 110 for allowing necessary freedom of movement of cable 144 during use.

Second stationary mount 124 is similarly secured to a suitable stationary anchor site on the helicopter, such as strut 126 adjacent control rod 72 for holding covering 146 stationary as the cable reciprocates.

Other embodiments of the present method also include the step of connecting the second end of the cable in actuating relationship to a fluid-actuated boost which moves the control rod in the manner disclosed in FIG. 9.

Having illustrated and described the principles involved in this invention by disclosing the presently preferred embodiment and several suggested alternatives, it should be apparent to those persons skilled in the art that such embodiments may be modified in arrangement and detail without departing from such principles. All such modifications as come within the true spirit and scope of the invention are claimed within the following claims.

I claim:

1. A hand-operated control system for aircraft having a cockpit and a plurality of orientation surfaces for controlling orientation of the aircraft during flight, the control system comprising:
   a push-pull control cable means operatively connected to a first of said control surfaces for controlling operation of said first control surface;
   a hand-operated control cable actuating means in the cockpit operatively connected to said push-pull control cable means; and
   a hand-operated function control means for controlling a second of said control surfaces, said control cable actuating means being mounted on said function control means such that the control cable actuating means is bidirectionally rotatable about a longitudinal axis generally defined by the function control means and such that operation of the control cable actuating means operates said first control surface independently of the operation of any other control surface and said function control means operates said second control surface independently of the operation of the first control surface.

2. The control system of claim I wherein said push-pull control cable means comprises a push-pull cable means and a push-pull fluid-operated boost cylinder means connected in series.

3. The control system of claim 1 wherein said function control means is a movable relative to and said actuating means is movable relative to and independently of the movement of said stick.

4. The control system of claim 3 wherein said actuating means comprises a handgrip on said stick.

5. The control system of claim 4 wherein said handgrip includes rigid extension means engageable by the back of the operator s hand for increasing a moment arm of the handgrip during twisting of the handgrip to facilitate rotation of the handgrip.

6. The control system of claim 1 wherein said aircraft includes foot pedal means and orientation linkage operable by such foot pedal means, and wherein said push-pull control cable means is operably connected to said orientation linkage such that said orientation linkage can be operated alternatively either by an existing foot pedal or by said hand-operated control actuating means.

7. The control system of claim 6 and further comprising fluid-actuated boost cylinder means operatively connected at one end to said cable means and at a second end to said orientation linkage.

8. The control system of claim 6 and further comprising fluid-actuated boost cylinder means, said cable means and boost cylinder means being operatively interconnected such that operation of one thereof operates the other thereof, and one of said cable means and cylinder means being operatively connected to said orientation linkage means, the other said cable means and cylinder means being operatively connected to said actuating means.

9. A hand-operated control system for aircraft having a cockpit and a plurality of orientation surfaces for controlling orientation of the aircraft during flight, the control system comprising:

a push-pull control cable means operatively connected to a first of said control surfaces for controlling operation of said first control surface;

a hand-operated control cable actuating means in the cockpit operatively connected to said push-pull control cable means; and a hand-operated function control means for controlling a second of said control surfaces, said control cable actuating means being mounted on said function control means such that operation of the control cable actuating means operates said first control surface independently of the operation of any other control surface and said function control means operates said second control surface independently of the operation of the first control surface, wherein said actuating means comprises means for actuating two orienting surfaces of the aircraft other than the surface actuated by said function control means, said cable actuating means comprising first bidirectionally rotatable means rotatable about a first axis for actuating one of said surfaces independently of any other surface, and further comprising a second bidirectionally rotatable means rotatable about a second axis for actuating another of said surfaces independently of any other surface.

10. A hand-operated control system for aircraft having a cockpit and a plurality of orientation surfaces for controlling orientation of the aircraft during flight, the control system comprising:

a push-pull control cable means operatively connected to a first of said control surfaces for controlling operation of said first control surface;

a hand-operated control cable actuating means in the cockpit operatively connected to said push-pull control cable means; and a hand-operated function Control means for controlling a second of said control surfaces, said control cable actuating means being mounted on said function control means such that operation of the control cable actuating means operates said first control surface independently of the operation of any other control surface and said function control means operates said second control surface independently of the operation of the first control surface, wherein said push-pull control cable means includes a first push-pull control cable means for operating said first control surface and further comprises a second push-pull control cable means for operating a control surface other than said first surface, said actuating means comprising first actuating means for actuating said first push-pull control cable means and a second actuating means for actuating said second push-pull control cable means, said first and second actuating means being mounted on said function control means and being operable with the same hand on the control.

11. A method of supplementing a foot pedal-operated control system with a hand-operated control system in an aircraft having a cockpit with a generally upright hand-operated control instrument and a control linkage normally controlled by the foot pedal, the method comprising;

mounting a hand-operated control cable actuating means on a top end of the hand-operated control instrument such that the actuating means is bidirectionally rotatable about a longitudinal axis generally defined by the control instrument; and operatively connecting a push-pull cable means at a first end to the control linkage and at a second end to the hand-operated control cable actuating means in the cockpit such that operation of the push-pull cable means operates the control linkage without foot actuation of the foot pedal and such that foot actuation of the foot pedal operates the control linkage without hand actuation of the push-pull actuating means.

12. The method of claim 11 including mounting the hand-operated actuating means on the hand-operated control instrument in a manner such that the control instrument and actuating means function independently of one another.

13. A hand-operated yaw control system for a helicopter having a tail rotor for counteracting torque induced by rotation of a main rotor assembly, the control system comprising:

a hollow, cyclic control stick having a cylindrical upright portion to be grasped by an operator, the upright portion having a circular, open top;

a foot pedal mounted to a pedal shaft for reciprocal rotation of the pedal shaft;

a tail rotor control rod connected to the pedal shaft by a control link having an anchor site;

a cylindricl spindle in the open top of the hollow cyclic control stick and projecting outwardly therefrom, the longitudinal axis of the cylindrical spindle being substantially coincident with the longitudinal axis of the upright portion;

a handle grip rotatably mounted to the spindle, the handle grip being comprised of an upright butt having a plurality of finger-receiving indentations on one side thereof, and an enlarged diameter portion that forms a substantially horizontal hand-rest disc at the base of the butt;

a first mount secured to the cyclic control stick adjacent the handle grip, the first mount being provided with a collar which rotates relative to the first mount;

a push-pull cable means secured at a first end to the enlarged diameter portion of the handle grip and connected at a second end to the anchor site on the control link, the cable means being comprised of a stationary covering and reciprocating cable therewithin, the cable covering being fixed to the collar on the first mount to prevent longitudinal displacement of the covering while permitting the cable to reciprocate within the covering; and a second mount secured to a stationary portion of the helicopter adjacent the control link, the second mount preventing longitudinal displacement of the covering while permitting the cable to reciprocate within the covering.

14. A hand-operated control system for aircraft having a cockpit and a plurality of orientation surfaces for controlling orientation of the aircraft during flight, the control system comprising:

a control cable means comprising a sheathed cable operatively connected to a first of said control surfaces for controlling operation of said first control surface;

a hand-operated control cable actuating means mounted in the cockpit and operatively connected to said cable means; and a hand-operated function control means for controlling a second of said control surfaces, said control cable actuating means being mounted on said function control means such that the control cable actuating means is bidirectionally rotatable about a longitudinal axis generally defined by the function control means and such that operation of the control actuating means operates said first control surface independently of the operation of any other control surface and said function control means operates said second control surface independently of the first control surface.

15. A method of converting a foot pedal-operated aircraft control system to a hand-operated control system in an aircraft having a foot pedal which operates an orientation linkage for controlling a first orientation surface of the aircraft and a generally upright hand-operated control stick for controlling at least one other orientation surface of the aircraft, the method comprising the steps of:

mounting a hand-operated control cable actuating means on a top end of the control stick such that the actuating means is bidirectionally rotatable about a longitudinal axis generally defined by the control stick;

operatively connecting a fist end of a control cable means to the actuating means: and operatively connecting a second end of the control cable means to the orientation linkage for controlling the first orientation surface of the aircraft and no other surface through hand rotation of the actuating means.

16. The method of claim 15 including attaching the control actuating means to an existing hand-operated control instrument in the cockpit in a manner such that the actuating means and the control instrument are independently operable.

17. The method of claim 16 wherein the method further comprises the step of using a cable means of sufficient length for allowing independent movement of the control instrument and the orientation linkage.

18. A hand-operated yaw control system for a helicopter having a tail rotor for counteracting torque induced by rotation of a main rotor assembly, the control system comprising:

a hand-operated cyclic control stick having a cylindrical upright portion adapted to be grasped by an operator;

a foot pedal shaft;

a tail rotor control rod connected to the pedal shaft by a control link having an anchor site;

a cylindrical handle grip rotatably mounted on the top of the cyclic control stick and projecting outwardly therefrom, the longitudinal axis of the cylindrical handle grip being substantially coincident with the longitudinal axis of the upright portion;

the handle grip being comprised of an upright butt and an enlarged diameter portion that forms a substantially horizontal hand-rest disc at the base of the butt;

a first mount secured to the cyclic control stick adjacent the handle grip, the first mount being provided with a collar which rotates relative to the first mount;

a push-pull cable means secured at a first end to the enlarged diameter portion of the handle grip and connected at a second end to the anchor site on the control link, the cable means being comprised of a stationary covering and reciprocating cable therewithin, the cable covering being fixed to the collar on the first mount to prevent longitudinal displacement of the covering while permitting the cable to reciprocate within the covering; and a second mount secured to a stationary part on the helicopter adjacent the control link, the second mount preventing longitudinal displacement of the covering while permitting the cable to reciprocate within the covering.

* * * * *

UNITED STATES PATENT AND TRADEMARK OFFICE
CERTIFICATE OF CORRECTION

PATENT NO. : 4,819,896

DATED : April 11, 1989

INVENTOR(S) : James L. Narad

It is certified that error appears in the above-identified patent and that said Letters Patent is hereby corrected as shown below:

Column 6, line 41, "FIGS. 1 2 3 and 6" should be "FIGS. 1, 3 and 6".

Column 9, lines 2 and 3, please delete the spacing and the paragraph indention between "rotatable" and "collar".

In the Claims:

Column 11, line 15, after the word "movable" insert -- control stick -- and delete the words [relative to] on that line.

Column 11, line 22, please insert an apostrophe in the space found between the word "operator" and "s" to form the word "operator's".

Column 13, line 8, please change the word "cylindricl" to "cylindrical".

Column 14, line 10, please change the word "fist" to "first".

Column 14, line 11, please change the colon after the word "means" to a semicolon.

Signed and Sealed this

Third Day of October, 1989

Attest:

DONALD J. QUIGG

Attesting Officer

Commissioner of Patents and Trademarks